United States Patent [19]

Saegusa

[11] Patent Number: 5,198,850
[45] Date of Patent: Mar. 30, 1993

[54] CAMERA HAVING E²PROM
[75] Inventor: Takashi Saegusa, Kawasaki, Japan
[73] Assignee: Nikon Corporation, Tokyo, Japan
[21] Appl. No.: 719,343
[22] Filed: Jun. 24, 1991
[30] Foreign Application Priority Data Jun. 26, 1990 [JP] Japan .................................. 2-165554

[51] Int. Cl.⁵ .............................................. G03B 7/00
[52] U.S. Cl. .................................................... 354/412
[58] Field of Search ........................ 354/412, 456, 410

[56] References Cited
U.S. PATENT DOCUMENTS

| 4,733,265 | 3/1988 | Haraguchi et al. | 354/412 |
| 4,978,982 | 12/1990 | Ishikawa et al. | 354/21 |
| 5,053,797 | 10/1991 | Samuels et al. | 354/322 |

Primary Examiner—Donald A. Griffin
Assistant Examiner—Jae N. Noh
Attorney, Agent, or Firm—Shapiro and Shapiro

[57] ABSTRACT

A camera comprising E²PROM storing therein writing data for check sum and a plurality of adjustment data for compensating the control value of the camera to control the camera properly, and capable of electrically rewriting the data and holding the rewritten data still after a power source switch is opened, a comparator for finding the sum total of the writing data for check sum and the adjustment data in response to the closing of the power source switch and comparing the sum total with a predetermined value, and a monitoring device for effecting at least one of warning and release inhibition when the result of the comparison by the comparator is that the sum total is not equal to the predetermined value.

3 Claims, 3 Drawing Sheets

CAMERA HAVING E²PROM

BACKGROUND OF THE INVENTION

1. Field of the Invention

This invention relates to a camera in which a plurality of adjustment data are stored in E²PROM capable of electrically rewriting data and retaining the rewritten data still after a power source switch is opened and a control value is compensated by these adjustment data to thereby accomplish proper control.

2. Related Background Art

Heretofore, in a camera of this kind, a plurality of adjustment data have been stored in E²PROM and a control value has been compensated by these adjustment data to thereby accomplish proper control.

In the past, however, not much consideration has been paid to reliability, and this has led to a problem that the control value goes wrong when the adjustment data are rewritten by an unexpected accident.

SUMMARY OF THE INVENTION

The present invention is proposed to solve such a problem, and determines data for check-up, finds the sum total of adjustment data and the data for check-up in response to the closing of a power source switch, and effects at least one of warning and release inhibition when said sum total does not become a predetermined value.

Thus, according to the present invention, when the adjustment data have been rewritten by some accident or other, the sum total of the adjustment data and the data for check-up does not become a predetermined value and it can be easily discriminated that the adjustment data have been rewritten.

DESCRIPTION OF THE PREFERRED EMBODIMENT

A camera according to the present invention will hereinafter be described in detail.

Figure 1:
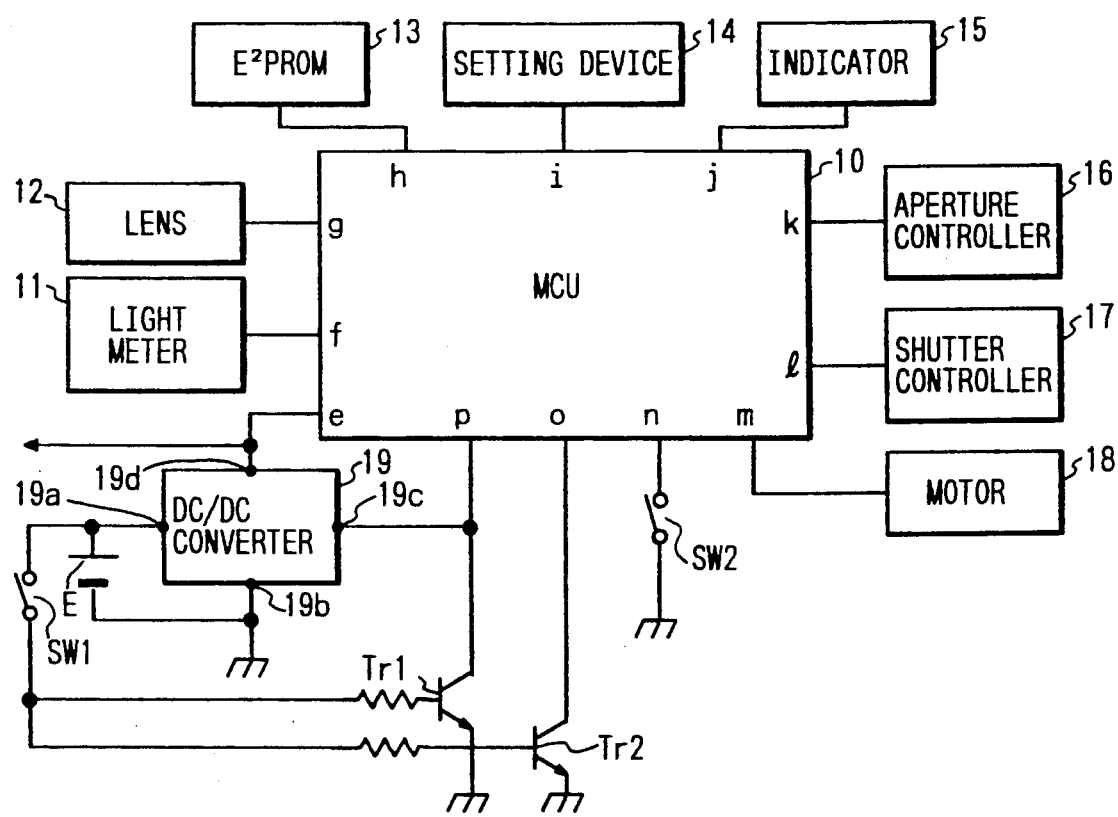
FIG. 1 is a block diagram showing an embodiment of a camera according to the present invention.

FIG. 1 is a block diagram showing an embodiment of this camera. In FIG. 1, the reference numeral 10 designates a microcomputer (hereinafter referred to as the MCU) for processing the information of an apparatus which will now be described.

The reference numeral 11 denotes a light meter which inputs luminance information to the A/D conversion input terminal f of the MCU 10.

The reference numeral 12 designates a phototaking lens which is mounted on the camera to thereby transmit the various types of information of the lens to the MCU 10 through a lens contact, not shown, and a terminal g.

| Address | Substance of Data Stored |
|---------|--------------------------|
| 00 | Exposure control mode |
| 01 | Set shutter speed |
| 02 | Set aperture value |
| 03 | Set film speed |
| . | . |
| . | . |
| 0F | Number of film frames |
| 10 | Photometric value compensation level |
| 11 | Photometric value compensation γ |
| 12 | Aperture value compensation data |
| . | . |
| . | . |
| 1E | Shutter speed compensation data |
| 1F | Written data for checking sum |

The reference numeral 13 denotes a memory element (so-called E²PROM) capable of electrically rewriting data and retaining the rewritten data still after a power source switch is opened. As shown in the table above, this memory element memorizes adjustment data (addresses $10-1E) and set data (addresses $00-0F) necessary for the control of the camera, and exchanges data with the MCU 10 through a terminal h.

The reference numeral 14 designates a setting device for setting the mode, the shutter speed, the aperture, the film speed, etc. necessary for the control of the camera. The setting device 14 is connected to the MCU 10 through a terminal i.

The reference numeral 15 denotes an indicator which effects indication in accordance with the result calculated by the MCU 10 and in conformity with a signal produced at a terminal j.

The reference numeral 16 designates an aperture controller which effects aperture control in accordance with a signal produced at the terminal k of the MCU 10 after release.

The reference numeral 17 denotes a shutter controller which controls the shutter speed to a predetermined shutter speed in accordance with a signal produced at the terminal l of the MCU 10 after the completion of mirror up.

The reference numeral 18 designates a motor driver which effects the sequence operation after release and the operation during rewinding in conformity with a signal produced at the terminal m of the MCU 10.

The reference numeral 19 denotes a DC/DC converter which produces a constant voltage at a terminal 19d when a power source E is applied between terminals 19a and 19b and a terminal 19c assumes L. When the terminal 19c is at H, the constant voltage is not produced at the terminal 19d. Accordingly, when the terminal 19c assumes L, the terminal 19d is connected to the power source line and a constant voltage is applied to the entire circuit. When the constant voltage is applied to the entire circuit, the MCU 10 and others begin to work, and when the terminal 19c assumes H, there is no longer the application of the constant voltage to the entire circuit, and the MCU 10 and others stop working.

A switch SW1 is a power source switch adapted to be closed when an attempt is made to supply the power source to the camera, and to be opened when an attempt is made to cut off the supply of the power source to the camera. When the power source switch SW1 is closed, a transistor Tr1 is turned on and the terminal 19c of the DC/DC converter 19 assumes L and therefore, the constant voltage is applied to the entire circuit. Simultaneously therewith, a transistor Tr2 is also turned on and therefore, the terminal 0 of the MCU 10 assumes L. Thus, the MCU 10 can know that the power source switch SW1 has been closed. That is, the MCU 10, after being started, renders a terminal p into L and holds the application of the constant voltage to the entire circuit after the opening of the power source switch SW1. At this time, the state of the switch SW1 can no longer be read from the terminal p and therefore, the terminal 0 becomes separately necessary.

A switch SW2 is a release switch which is connected to the terminal n of the MCU 10 and starts the release sequence when it becomes closed.

Figure 2:
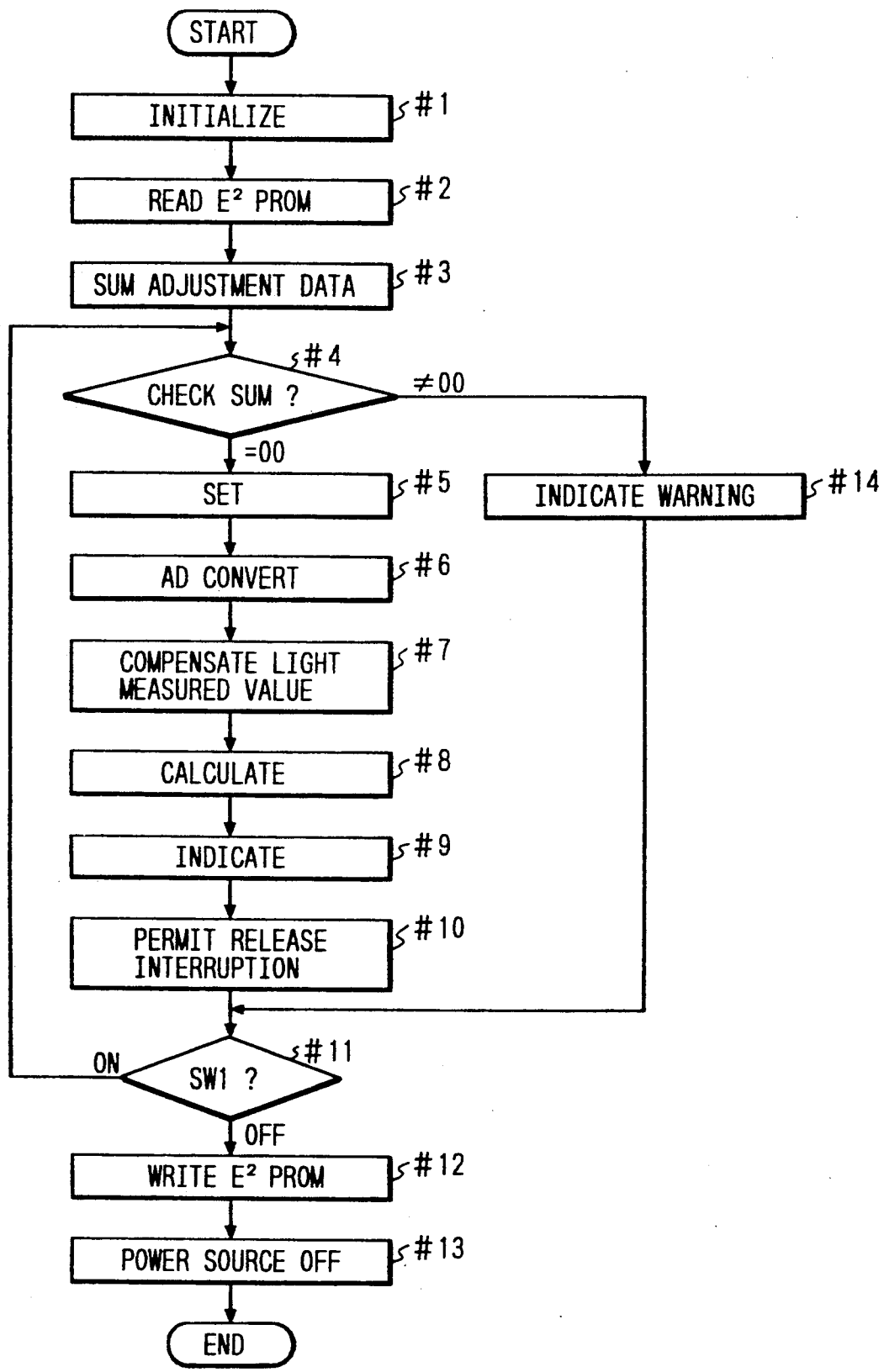
FIG. 2 is a flow chart of the main routine of a microcomputer in the camera of FIG. 1.

FIG. 2 is a flow chart of the main routine of the MCU 10.

When the switch SW1 is closed, the transistor Tr1 is turned on and the terminal 19c of the DC/DC converter 19 assumes L, and the application of a constant voltage from the terminal 19d to the entire circuit including the MCU 10 is started. Thereupon, the MCU 10 starts processing from a predetermined address in accordance with a command stored therein.

First, at a step #1, initialization is effected. That is, the initialization of RAM and an input and an output is effected. At this time, the MCU 10 renders the terminal p into L. By doing so, the application of the constant voltage to the entire circuit is held still after the switch SW1 is opened.

Subsequently, at a step #2, the reading of E²PROM 13 is effected and the set data and adjustment data shown in the table above are stored in the RAM of the MCU 10. The set data stored in the RAM are indicated as the last set data, with the result of calculation, by the indicator 15 at a step #9. By such indication being effected, it becomes possible to set the current data while modifying the last set data, and very high usability is provided in the camera wherein the power source switch is frequently closed and opened for energy saving.

Subsequently, at a step #3, the summing of sixteen data from data X(10) stored in the address $10 in the table above to data (1F) stored in the address $1F is effected as follows, whereby the check sum S is found.

$$S = \sum_{n=10}^{n=1F} X(n)$$
$$= X(10) + X(11) + \ldots + X(1E) + X(1F).$$

At a step #4, whether the check sum S is 0 (a predetermined value) is discriminated. At this time, processing is effected with the carry-over excluded. That is, 150 is regarded as 50, and is considered to be equal to a case where there is no carry-over and 50 is provided. That is, the check sum S is found as a sum total excluding the carry-over of the adjustment data of the addresses $10−1E and the written data of the address $1F for check sum, and comparison as to whether this check sum S is 0 is effected. If the check sum S is 0, advance is made to a step #5, and if the check sum does not become 0, advance is made to a step #14. The data of X(10) to X(1E) in the table above differ depending on the result of adjustment, but if the written data of X(1F) for check sum is predetermined in conformity with that result, the above equation can always be satisfied. Conversely, a case where the above equation is not satisfied is a case where there is some abnormality in E²PROM 13. Consequently, it is when E²PROM is normal that advance is made to the step #5, and it is when some abnormality occurs to E²PROM that advance is made to the step #14.

At the step #5, setting is effected. At this step, the setting of data necessary for calculation is effected by the terminals g and i with the aid of the information from the lens 12 and the setting device 14.

Subsequently, at a step #6, the input of the analog value of the luminance information in the light meter 11 from the terminal f is A/D-converted.

Next, at a step #7, the A/D-converted value is compensated by the light measured value compensation level stored in the address $10 shown in the table above and the light measured value compensation Y stored in the address $11, and is introduced as luminance data.

At a step #8, conventional apex calculation is effected in accordance with the set data determined at the step #5 and the luminance data determined at the step #7, whereby a control value conforming to the set mode is found.

At a step #9, the terminal j is driven on the basis of the calculated control value to thereby cause the indicator 15 to indicate.

At a step #10, release interruption is permitted.

At a step #11, the ON/OFF of the power source switch SW1 is examined by the input of the terminal o. If the power source switch SW1 is ON, the transistor Tr2 is ON and therefore the terminal o assumes L, and if the power source switch SW1 is OFF, the transistor Tr2 is turned off and therefore, the terminal o assumes H by a pull-up resistor contained therein. If the power source switch SW1 is ON, return is made to the step #4, and if the power source switch SW1 is OFF, advance is made to a step #12.

When the power source switch SW1 is OFF, advance is made to the step #12, where the writing into E²PROM 13 is effected. Here, only the set data changed in the setting process of the step #5 is rewritten in E²PROM 13. Since the writing into E²PROM 13 takes much time, the data of E²PROM 13 is read and checked by each byte and only different data are rewritten.

At a step #13, the terminal p is rendered into H to thereby render the power source OFF. Thereupon, the power source switch SW1 is already OFF and the transistors Tr1 and Tr2 also are OFF and therefore, the terminal 19c of the DC/DC converter 19 assumes H and thus, the application of the constant voltage to the entire circuit is cut off.

On the other hand, the process of the step #14 is executed when the check sum S does not become 0. At the step #14, the terminal j is driven to cause the indicator 15 to indicate a warning. In that case, advance is made to the step #11 and the process of the step #10 is not carried out and therefore, release interruption is not effected and the indication of the warning is continued until the power source switch SW1 is opened.

Figure 3:
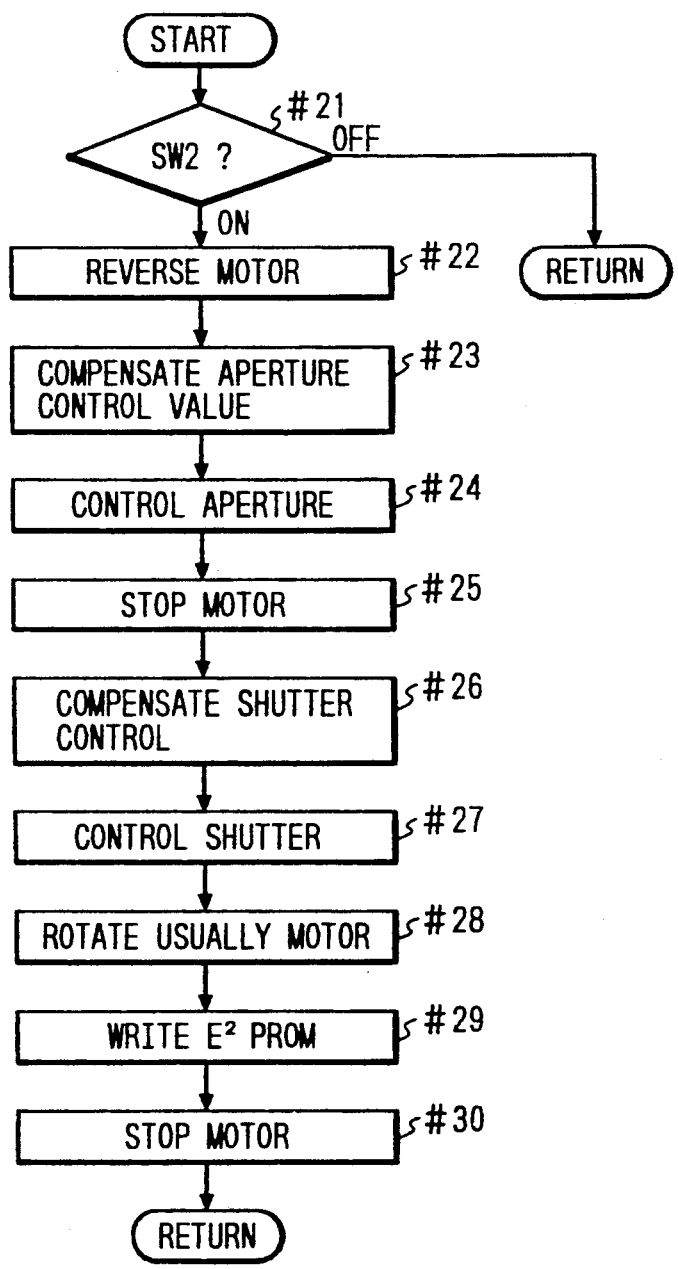
FIG. 3 is a flow chart of an interruption process routine for the release process of this microcomputer.

FIG. 3 is a flow chart of an interruption process routine for the release process of the MCU 10. When the release interruption is permitted at the step #10 of the flow chart of FIG. 2, the main routine is executed at predetermined time intervals.

In this interruption process routine, at a step #21, whether the release switch SW2 is ON or OFF is first examined. If the release switch SW2 is ON, advance is made to a step #22, and if the release switch SW2 is OFF, return is made.

Consequently, the process of the step #22 and subsequent steps is executed only when the release switch SW2 is ON.

At the step #22, the motor driver 18 is driven through the terminal m to reverse the motor, thereby starting the release sequence. Thereupon, the mirror is moved up in response to the reversal of the motor.

At a step #23, the aperture control value calculated at the step #8 is compensated in conformity with the aperture value compensation data stored in the address $12 shown in the table above, and a control value for actual control is found.

At a step #24, the aperture controller 16 is driven through the terminal k to control the aperture to said compensated aperture value.

At a step #25, the motor is stopped by the change of a switch, not shown, which informs of the completion of the mirror up.

At a step #26, the shutter control speed value calculated at the step #8 is compensated in conformity with the shutter speed compensation data stored in the address $1E shown in the table above, and a control value for actual control is found.

At a step #27, the shutter controller 17 is driven through the terminal l to control the shutter speed to said compensated shutter speed value.

At a step #28, the motor driver 18 is driven through the terminal m to effect the forward rotation of the motor. Thereupon, the downward movement of the mirror starts.

At a step #29, only the set data (the data such as the number of film frames) which has changed in the process of the step #5 are rewritten in E²PROM 13. That is, as in the case of the step #12, the data in E²PROM are read and checked by one byte each, and only the set data which have changed in substance are rewritten.

The time required for the writing into E²PROM is very long as compared with the time required for the reading and therefore, the time will be shortened if the writing can be omitted even if the reading is effected.

At a step #30, the motor is stopped at predetermined timing determined by a switch input concerned with mechanical parts, and return is made.

The rewriting of the set data at the step #29 is effected while the motor is rotating. Thus, no waste occurs to the processing time in the MCU 10.

As can be seen from the foregoing description, the data of E²PROM 13 are concerned with various calculations and the reliability of the data of E²PROM 13 is very important. Actually, there can hardly exist the probability with which the data of E²PROM 13 are rewritten, but there are rarely cases where the data are rewritten by the removal of the battery during the rewriting of the data or by the influence of static electricity or the like. The data stored in E²PROM 13 include two kinds of data, i.e., adjustment data and set data, and during the rewriting of the set data, the adjustment data may sometimes be rewritten under the influence thereof. The set data can be confirmed by indication and therefore can be re-set if they differ. However, with regard to the adjustment data, if the value written so that control may become proper is rewritten into a different value, the then control value will become wrong without fail. In such case, it will be difficult for the photographer to know the wrongness unless the control value becomes a very abnormal value.

In contrast, according to the present embodiment, when the adjustment data in E²PROM have been rewritten, the check sum S at the step #4 shown in FIG. 2 does not become 0 and therefore, advance is made from the step #4 to the step #14, where a warning is indicated and thus, discrimination as to propriety or wrongness becomes possible. That is, at the step #14, the indicator 15 is driven to indicate a warning and thus, the photographer can know abnormality. For example, if the substance of the indication is made different from the other warning indications, it will become possible to bring the camera to a service center. Also, at this time, the process of the step #10 is not executed and therefore, the permission of release interruption does not take place and the release interruption process routine of FIG. 3 is not executed. Consequently, release becomes inhibited. If advance is made from the step #14 to the step #11 and the power source switch SW1 is ON, return is made to the step #4, but the check sum is not 0 and therefore, the warning indication of the step #14 is only repeated. If the power source switch SW1 becomes OFF, advance is made to the step #12, where only the set data which have changed in the setting process of the step #5 are rewritten in E²PROM 13.

As described above, according to the camera of the present invention, data for check-up are determined and the sum total of the adjustment data and the data for check-up is found in response to the closing of the power source switch, and if this sum total does not become a predetermined value, at least one of warning and release inhibition is effected and therefore, when the adjustment data have been rewritten by some accident or other, the sum total of the adjustment data and the data for check-up does not become a predetermined value and it can be readily discriminated that the adjustment data have been rewritten, and at that point of time, warning or release lock or both are effected, whereby the photographer can be prevented from performing wrong photographing, and a reliability is improved.

I claim:

1. A camera including:
   E²PROM storing therein set data necessary for the control of the camera, writing data for check sum and a plurality of adjustment data for compensating a control value of said camera to control said camera properly, and capable of electrically rewriting the data, and holding the rewritten data still after a power source switch is opened;
   setting means for rewriting said set data;
   discriminating means for discriminating the sum total of said writing data for check sum and said adjustment data in response to the closing of the power source switch, and discriminating whether said sum total is equal to a predetermined value; and
   monitoring means for effecting at least one of warning and release inhibition when the result of the discrimination by said discriminating means is that said sum total is not equal to said predetermined value.

2. A camera including:
   E²PROM storing therein set data necessary for the control of the camera and a plurality of adjustment data for compensating a control value of said camera to control said camera properly, and capable of electrically rewriting the data, and holding the rewritten data still after a power source switch is opened;
   setting means for rewriting said set data;
   discriminating means for discriminating whether the sum total of said adjustment data is a predetermined value; and monitoring means for effecting warning or release inhibition in conformity with the result of the discrimination by said discriminating means.

3. A camera including:

E²PROM storing therein set data necessary for the control of the camera, writing data for check sum and a plurality of adjustment data for compensating a control value of said camera to control said camera properly, and capable of electrically rewriting the data, and holding the rewritten data still after a power source switch is opened;

setting means for rewriting said set data;

discriminating means for discriminating whether the sum total of said writing data for check sum and said adjustment data is in a predetermined relation; and monitoring means for effecting warning or release inhibition in conformity with the result of the discrimination by said discriminating means.

* * * * *